UNITED STATES PATENT OFFICE.

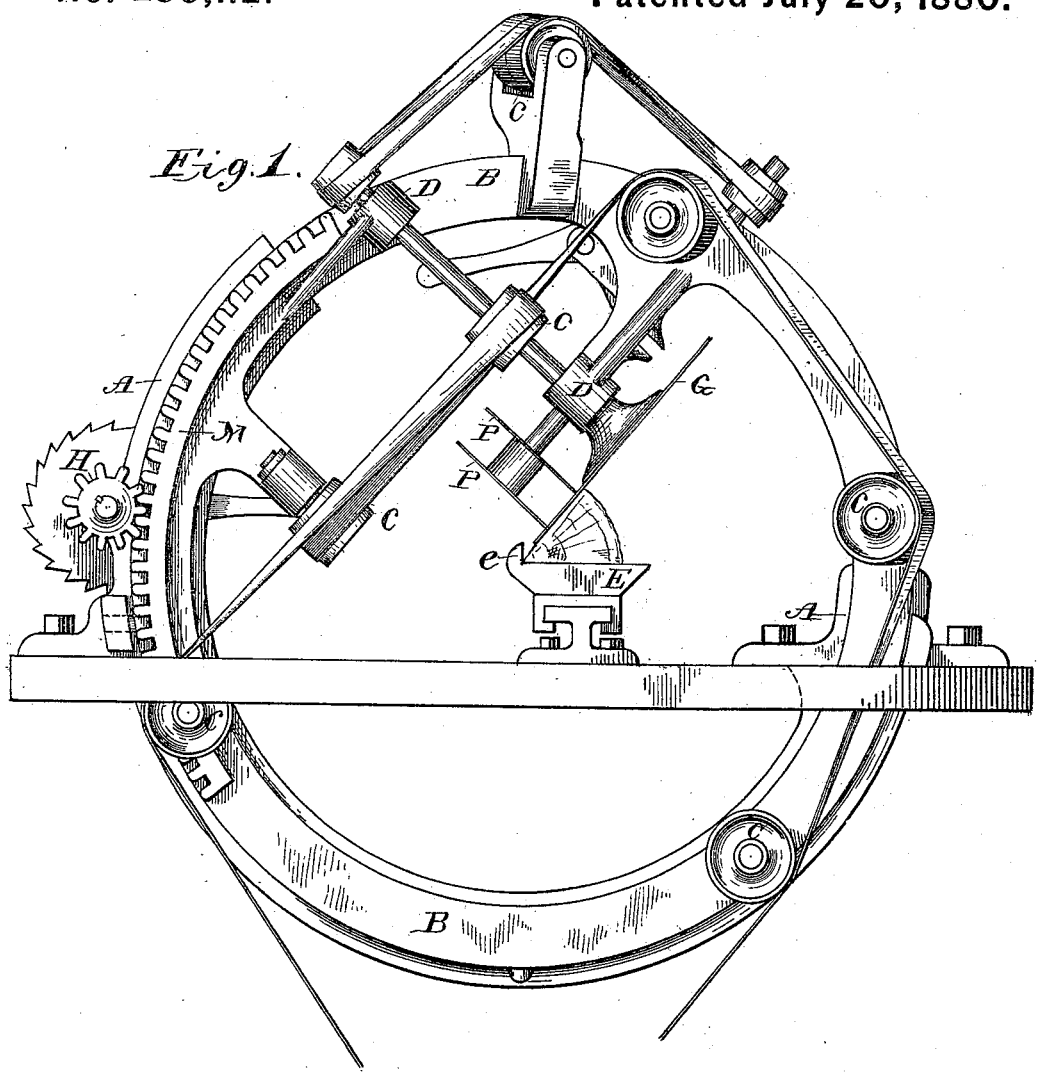

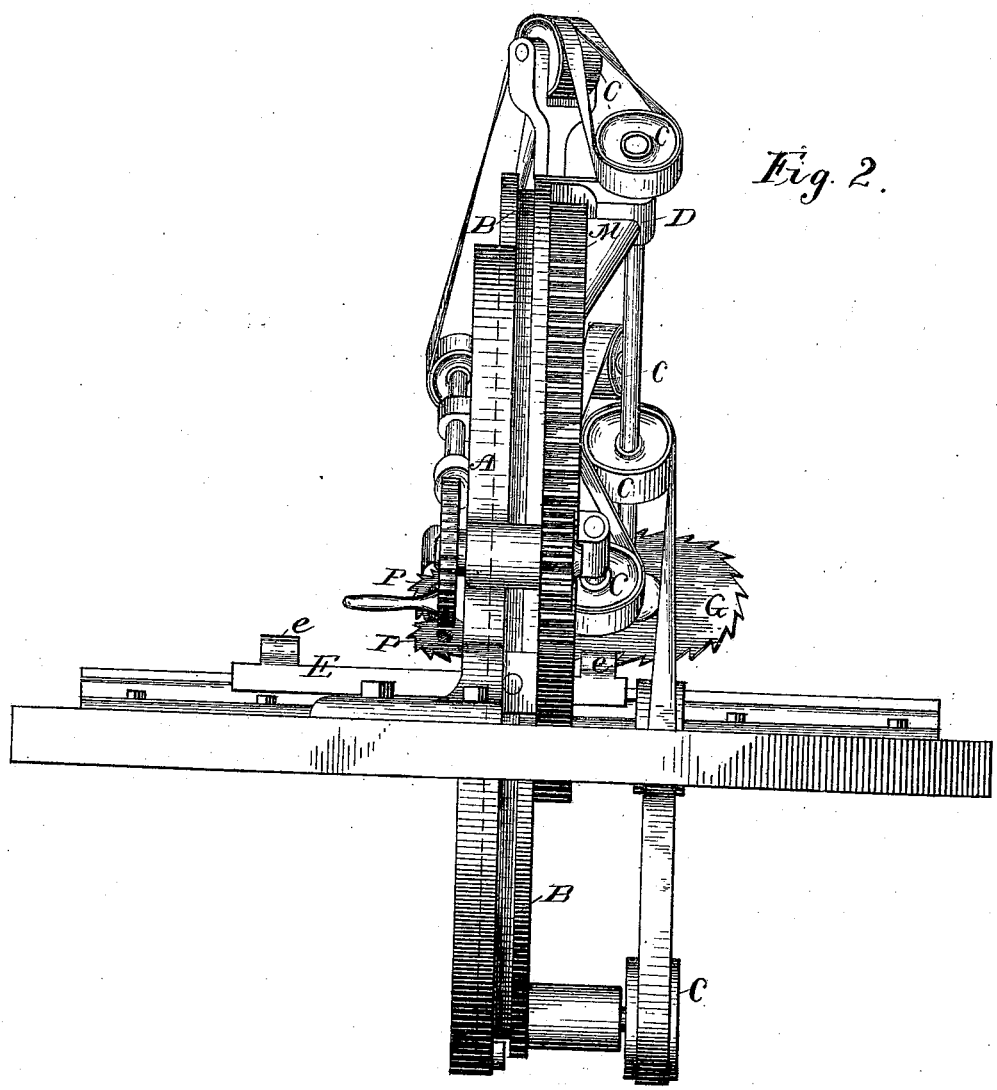

ALBERT CUNNINGHAM, OF MILWAUKEE, WISCONSIN.

CLAPBOARD-MACHINE.

SPECIFICATION forming part of Letters Patent No. 230,112, dated July 20, 1880.

Application filed November 26, 1879.

*To all whom it may concern:*

Be it known that I, ALBERT CUNNINGHAM, of Milwaukee, in the county of Milwaukee, and in the State of Wisconsin, have invented certain new and useful Improvements in Siding or Clapboard Machines; and I do hereby declare that the following is a full, clear, and exact description thereof.

My invention relates to siding or clapboard machines; and it consists in mechanism for supporting and adjusting the inclination of the saw with relation to the carriage so that it will always point to a given center, as will hereinafter be fully set forth.

Figure 1 is a front view of my invention, and Fig. 2 a side or edge view.

A is a frame, which consists of a segment of a circle and which is let into the floor, to which it is firmly braced. This frame forms a way for the circular-saw carrier B to travel upon. The carrier B is provided with pulleys C C C at various intervals, over which the driving-belts pass.

D D are bearings for the arbor of the main saw G, and carry this saw with its cutting-edge continually pointing to a center about which the saw-carrier revolves.

To one side of the frame A, I attach a setting-wheel having a pinion which meshes with a cogged segment on the periphery of the carrier. I also provide the carrier with bearings for the arbor of edging-saws P P, which are carried at right angles to the main saw, and serve to edge the sidings after they have been taken off by the main saw. The logs must be quartered before they are ready for my machine.

Operation: Place the quarter on the carriage E, which may be of any approved construction, and which has a flange, e, for centering the quarter, with its heart-edge pointing to the flange e. Revolve the pinion H until it has carried the main saw into a vertical position; and motion having been imparted to it by any suitable machinery, the cant on being carried forward will be received by the saw, which, pointing to the center, will take off a wedge-shaped piece commonly called a "siding" or "clapboard." The carriage is then retracted and the carrier turned a given distance to change the inclination of the saw and set it for another cut. This is continued until the saw is nearly horizontal, when the quarter will have been consumed or cut into sidings, each one of which is a counterpart of the other.

What I claim as my invention, and desire to secure by Letters Patent, is—

1. A reciprocating log-carriage, in combination with a circular-saw-supporting frame movably mounted in a corresponding guide and means, substantially as shown, for moving the saw-frame in its guide, whereby the angle of the saw to the cant is adjusted, as set forth.

2. The combination of the reciprocating carriage and revolving saw-carrier with the saw G, edging-saws having bearings in the saw-carrier at right angles to those of said saw G, and a device for setting the carrier to give the saws the proper angle to the cant as it is consumed, as set forth.

In testimony that I claim the foregoing I have hereunto set my hand this 22d day of November, 1879.

ALBERT CUNNINGHAM.

Witnesses:
E. H. BOTTUM,
STANLEY S. STOUT.